US011182271B2

(12) United States Patent
Xu

(10) Patent No.: US 11,182,271 B2
(45) Date of Patent: Nov. 23, 2021

(54) PERFORMANCE ANALYSIS USING CONTENT-ORIENTED ANALYSIS

(71) Applicant: International Business Machines Corporation, Armonk, NY (US)

(72) Inventor: Jijiang Xu, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 1331 days.

(21) Appl. No.: 15/222,996

(22) Filed: Jul. 29, 2016

(65) Prior Publication Data

US 2018/0032904 A1 Feb. 1, 2018

(51) Int. Cl.
*G06F 11/36* (2006.01)
*G06N 20/00* (2019.01)

(52) U.S. Cl.
CPC ........ *G06F 11/3636* (2013.01); *G06F 11/366* (2013.01); *G06N 20/00* (2019.01)

(58) Field of Classification Search
CPC ............. G06F 11/3466; G06F 2201/88; G06F 11/3409; G06F 2201/865; G06F 11/3636; G06F 11/3419; G06F 11/366; G06N 20/00
See application file for complete search history.

(56) References Cited

U.S. PATENT DOCUMENTS

| 7,086,064 B1 | 8/2006 | Stevens | |
| 7,526,682 B1 | 4/2009 | Chacko et al. | |
| 7,797,338 B2 * | 9/2010 | Feng | H04L 67/22 707/781 |
| 8,099,631 B2 | 1/2012 | Tsvetkov | |
| 8,627,317 B2 | 1/2014 | Altman et al. | |
| 2006/0130001 A1 * | 6/2006 | Beuch | G06F 11/3466 717/130 |
| 2015/0095710 A1 | 4/2015 | Bates et al. | |

OTHER PUBLICATIONS

J. Roy, A. Ramanujan, "XML Schema Language: Taking XML to the Next Level," 2001, IEEE, IT Pro Mar./Apr. 2001, p. 40 (Year: 2001).*
Roessler et al., "Reconstructing Core Dumps," 2013, IEEE Sixth International Conference on Software Testing, Verification and Validation, pp. 114-123 (Year: 2013).*
Yuan et al., "Improving Software Diagnosibility via Log Enhancement," 2012, ACM Trans. Comput. Syst. 30, 1, Article 4, 28 pages (Year: 2012).*
Altman et al.; "Observations on Tuning a Java Enterprise Application for Performance and Scalability"; IBM Journal of Research and Development; © 2010; 12 Pages; vol. 54—Issue 5.

(Continued)

*Primary Examiner* — Miranda M Huang
*Assistant Examiner* — Catherine F Lee
(74) *Attorney, Agent, or Firm* — Stephen R. Yoder

(57) ABSTRACT

In an approach for providing a self-learning framework for performance analysis using content-oriented analysis, a processor initiates a performance analysis of a dump on a thread. A processor presents time information and an associated location of the time information. A processor analyzes the time information by registering the time information into a knowledge base to debug errors in a computer program. Subsequent to a query for dump information, a processor displays the analyzed time information, based on the performance analysis.

20 Claims, 2 Drawing Sheets

(56) References Cited

OTHER PUBLICATIONS

"Using the IBM DTFJ with the Eclipse Memory Analyzer Tool", IBM developerWorks, Printed Feb. 18, 2016, 2 pages, <http://www.ibm.com/developerworks/java/jdk/tools/mat.html>.

"Jhat—Java Heap Analysis Tool", ORACLE, © 2016, Printed Feb. 18, 2016, 1 page, <http://docs.oracle.com/javase/7/docs/technotes/tools/share/jhat.html>.

"The Industry Leader in .NET & Java Profiling", YourKit, © 2003-2016, Printed Feb. 18, 2016, 1 page, <https://www.yourkit.com>.

"HPjmeter Downloads and Documentation", Hewlett Packard Enterprise Development LP, © 2016, Printed Feb. 18, 2016, 3 pages, <https://h20392.www2.hpe.com/portal/swdepot/displayProductInfo.do?productNumber=HPJMETER>.

"HeapAnalyzer, the IBM alphaWorks Champion Technology since 2004", IBM developerWorks, Printed Feb. 18, 2016, 3 pages, <https://www.ibm.com/developerworks/community/groups/service/html/communityview?communityUuid=4544bafe-c7a2-455f-9d43-eb866ea60091>.

Grace Period Disclosure: XU; "Analyzing Stability Performance Issues Using the IBM Cognos Extension for IBM Memory Analyzer"; Insight 2015; Oct. 25-29, 2015; 44 Pages.

* cited by examiner

PERFORMANCE ANALYSIS USING CONTENT-ORIENTED ANALYSIS

STATEMENT REGARDING PRIOR DISCLOSURES BY THE INVENTOR OR A JOINT INVENTOR

The following disclosure(s) are submitted under 35 U.S.C. § 102(b)(1)(A):

DISCLOSURE(S)

(1) George Xu, Analyzing Stability Performance Issues Using the IBM Cognos Extension for IBM Memory Analyzer, October 2015.

BACKGROUND

The present invention relates generally to the field of performance analysis, and more particularly to providing a self-learning framework for performance analysis using content-oriented analysis.

In computing, a core dump consists of the recorded state of the working memory of a computer program at a specific time, generally, when the program has crashed or otherwise terminated abnormally, or a special user defined event or a certain piece of code is being executed. In practice, other key pieces of the program state are usually dumped at the same time, including the processor registers, which may include the program counter and stack pointer, local memory, overall memory management, and other processor and operating system flags and information. Core dumps are often used to assist in diagnosing and debugging errors, performance, and defect in computer programs.

SUMMARY

Aspects of an embodiment of the present invention disclose a method, computer program product, and computing system for providing a self-learning framework for performance analysis using content-oriented analysis. A processor initiates a performance analysis of a dump on a thread. A processor presents time information and an associated location of the time information. A processor analyzes the time information by registering the time information into a knowledge base to debug errors in a computer program. Subsequent to a query for dump information, a processor displays the analyzed time information, based on the performance analysis.

DETAILED DESCRIPTION

Embodiments of the present invention recognize that in a system with many threads running, it is extremely difficult to determine how long a thread, or a section of code, has been running without product source code knowledge. Embodiments of the present invention recognize that, often, the alternative is performance logging, which has many drawbacks and is almost impossible to do in a live production environment. Embodiments of the present invention support administrators/support analysts with investigating the dump with no need of product source knowledge, making it valuable to solve critical customer performance issues. Additionally, embodiments of the present invention provide a self-learning framework for performance analysis using content-oriented analysis.

Embodiments of the present invention will now be described in detail with reference to the Figures.

Figure 1:
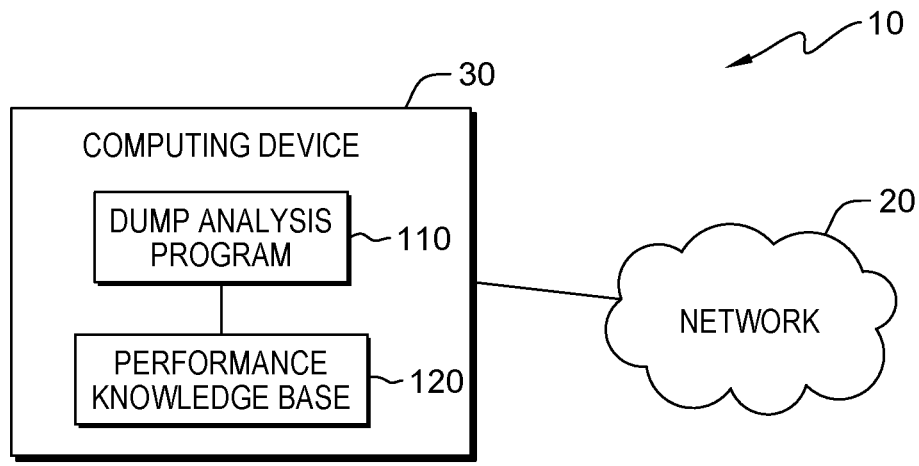
FIG. 1 depicts a block diagram of a computing system, in accordance with an embodiment of the present invention.

FIG. 1 depicts a block diagram of computing system 10, in accordance with one embodiment of the present invention. FIG. 1 provides an illustration of one embodiment and does not imply any limitations with regard to the environments in which different embodiments may be implemented.

In the depicted embodiment, computing system 10 includes computing device 30. In some embodiments, computing system 10 can send and receive information over network 20. Network 20 may be a local area network (LAN), a wide area network (WAN) such as the Internet, a cellular data network, any combination thereof, or any combination of connections and protocols that will support communications between computing device 30, and other computing devices that may send information to computing device 30 or receive information from computing device 30, in accordance with embodiments of the invention. Network 20 may include wired, wireless, or fiber optic connections. Computing system 10 may include additional computing devices, servers, or other devices not shown.

Computing device 30 may be a management server, a web server, or any other electronic device or computing system capable of processing program instructions and receiving and sending data. In some embodiments, computing device 30 may be a laptop computer, tablet computer, netbook computer, personal computer (PC), a desktop computer, or any programmable electronic device capable of communicating with another computing device via network 20. In other embodiments, computing device 30 may represent a server computing system utilizing multiple computers as a server system, such as in a cloud computing environment. In another embodiment, computing device 30 represents a computing system utilizing clustered computers and components to act as a single pool of seamless resources. In the depicted embodiment, computing device 30 contains dump analysis program 110 and performance knowledge base 120. In other embodiments, computing device 30 may include other components, as depicted and described in further detail with respect to FIG. 3.

Dump analysis program 110 provides a self-learning framework for performance analysis using content-oriented analysis. In doing so, dump analysis program 110 receives an indication that a user has initiated a time discovery process on a thread. Dump analysis program 110 discovers the variables that meet a set of criteria that looks like time information, and presents the time information for support analyst to review. Dump analysis program 110 receives an indication from a user to confirm some of the variables are, indeed, valid time information from the previous output, and the user can register time information for future use in performance knowledge base 120, such as an extensible markup language (XML) library. Performance knowledge base 120 can be used for other programs to present valid performance information over a thread, or all threads. Dump analysis program 110 displays analyzed time information. In the depicted embodiment, dump analysis program 110 resides on computing device 30. In other embodiments, dump analysis program 110 may reside on another computing device or another server, provided that dump analysis program 110 can access performance knowledge base 120.

Performance knowledge base 120 may be a repository that may be written to and/or read by dump analysis program 110. In some embodiments, dump analysis program 110 may store registered time information to performance knowledge base 120. A knowledge base is a technology used to store complex structured and unstructured information used by a computer system. A knowledge-based system consists of a knowledge base that represents facts and an inference engine that can reason about those facts and use rules and other forms of logic to deduce facts or highlight inconsistencies. In some embodiments, information stored in a knowledge base may include: function categories; descriptions; services; service functions; capabilities and configurations; and a lexical database for the English language. In other embodiments, dump analysis program 110 may store solutions to previous errors or problems to performance knowledge base 120. Dump analysis program 110 is able to learn, for future references, solutions that may assist in debugging similar errors via a self-learning framework.

In some embodiments, a program (not shown) may allow a web developer, administrator, or other user to define previously registered time information and store to performance knowledge base 120. In the depicted embodiment, performance knowledge base 120 resides on computing device 30. In other embodiments, performance knowledge base 120 may reside on another computing device or another server, provided that performance knowledge base 120 is accessible to dump analysis program 110.

Figure 2:
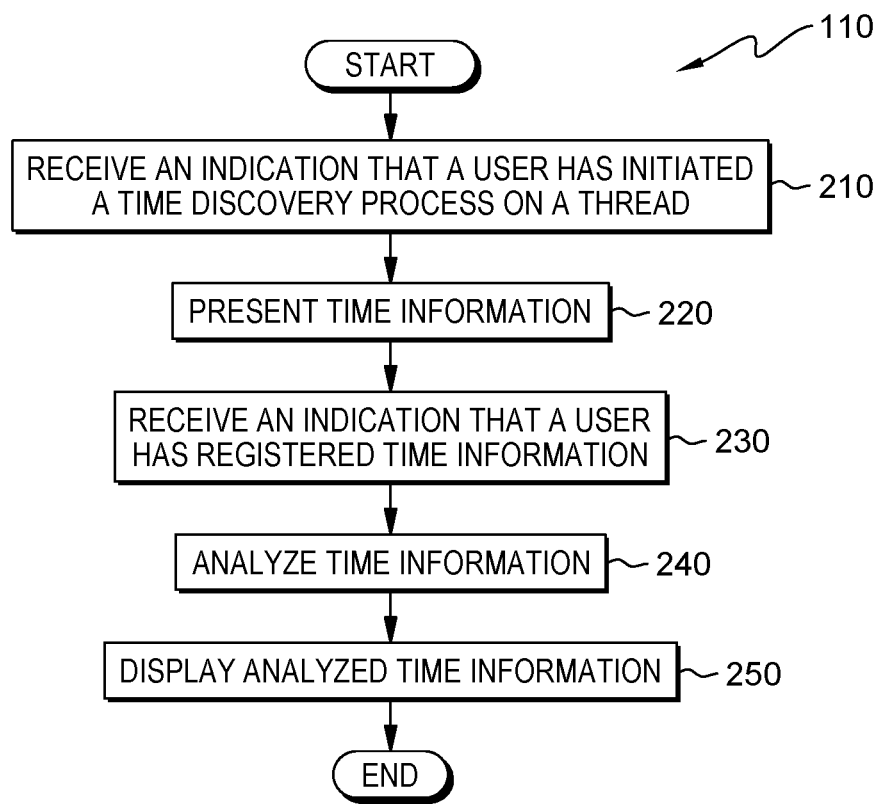
FIG. 2 depicts a flowchart of the steps of a dump analysis program, executing within the computing system of FIG. 1, for providing a self-learning framework for performance analysis using content-oriented analysis, in accordance with an embodiment of the present invention.

FIG. 2, depicts a flowchart of the steps of a dump analysis program, executing within the computing system of FIG. 1, in accordance with an embodiment of the present invention. Dump analysis program 110 provides a self-learning framework for performance analysis using content-oriented analysis.

A dump, herein, may be a core dump, or any other type of dump dealing with computing.

In step 210, dump analysis program 110 receives an indication that a user has initiated a time discovery process on a thread. The time discovery process is a performance analysis of a dump with minimum product source knowledge. The time discovery process can occur during a dump or after a dump. In one embodiment, dump analysis program 110 initiates a time discovery process on a thread. In other embodiments, a user initiates a time discovery process on a thread.

The following is an example of a time attribute that could be discovered by dump analysis program 110. A time attribute is a piece of information that explains a quality or feature regarded as a characteristic of the time element of the thread. Any attributes having a long/date data type prior to the current time can be a time attribute. A long data type is a subset of an integer data type, which is a primitive data type. A long integer can represent a whole integer, whose range is greater than or equal to that of a standard integer on the same machine. A date data type includes date values, time values, or date and time values. Date data types hold values that represent dates ranging from January 1 of the year 0001 through December 31 of the year 9999, and times from 12:00:00 AM (midnight) through 11:59:59.9999999 PM. These attributes are considered as time attribute candidates of interest. The time attribute discovery capability is independent of products or product releases.

In step 220, dump analysis program 110 presents time information. In one embodiment, dump analysis program 110 presents time information and associated location. In other embodiments, dump analysis program 110 presents the call stack along with the name of the attribute, and actual elapsed run time. If a variable is used many places in the call stack, the method only presents at the call stack's place of origin in order to reduce noise in the presentation, where the variable is a representation of a time attribute.

In step 230, dump analysis program 110, in one embodiment, receives an indication that a user has registered time information. In one embodiment, dump analysis program 110 registers time information. In other embodiments, a user registers time information. In some embodiments, a context menu allows registering time attributes, such as location, name, and object type, into a database, such as a knowledge base. Dump analysis program 110 has the ability to harvest performance information into a knowledge base via registration and assisted learning. An example of assisted learning is machine learning, the ability to learn without being explicitly programmed to do so.

Machine learning is a subfield of computer science that evolved from the study of pattern recognition and computational learning theory in artificial intelligence and gives computers the ability to learn without, explicitly, being programmed. Machine learning explores the study and construction of algorithms that can learn from and make predictions on data, such as performance information. Such algorithms operate by building a model from an example training set of input observations in order to make data-driven predictions or decisions expressed as outputs, rather than following strictly static program instructions.

Machine learning is employed in a range of computing tasks where designing and programming explicit algorithms is unfeasible. Example applications include: spam filtering, optical character recognition, search engines, and computer vision. Machine learning is sometimes conflated with data mining, where the latter sub-field focuses more on exploratory data analysis and is known as unsupervised learning. Within the field of data analytics, machine learning is a method used to devise complex models and algorithms that lend themselves to prediction; in commercial use, this is known as predictive analytics. These analytical models allow researchers, data scientists, engineers, and analysts to produce reliable, repeatable decisions and results and uncover hidden insights through learning from historical relationships and trends in the data.

In step 240, dump analysis program 110 analyzes time information. Dump analysis program 110 analyzes the time information to assist in diagnosing and debugging errors in a computer program, for example, determining how long a thread has been running, and determining other processor and operating system flags and information. In one embodiment, dump analysis program 110 analyzes the time information internally. In some embodiments, dump analysis program 110 analyzes the time information using a knowledge base, such as performance knowledge base 120. In other embodiments, dump analysis program 110 utilizes a knowledge base, such as performance knowledge base 120, systematically, to present the operational view of a system dump horizontally in the current activities query and vertically in the thread elapsed run time query.

In some embodiments, dump analysis program 110 uses information stored in performance knowledge base 120 to predict a diagnosis for a current error or problem, based on solutions for similar errors that happened in the past from similar computer programs.

In step 250, dump analysis program 110 displays analyzed time information. In one embodiment, dump analysis program 110 displays the analyzed time information in response to a query of dump information. In other embodiments, dump analysis program 110 automatically displays the time information after the analysis of the time information. In an additional embodiment, dump analysis program 110 displays the analyzed time information after a predetermined time period following the analysis of the time information.

In some embodiments, dump analysis program 110 utilizes the analyzed time information to display the time information in a horizontal view and a vertical view. The horizontal view presents current activities, an overview of all running threads and length of time for each thread. The horizontal view displays the performance/thread start time previously registered, and exposes the long run activities in a sorted fashion. The vertical view shows the elapsed run times in a thread, providing the time breakdown in the call stack and identifies the performance bottleneck in the thread.

Figure 3:
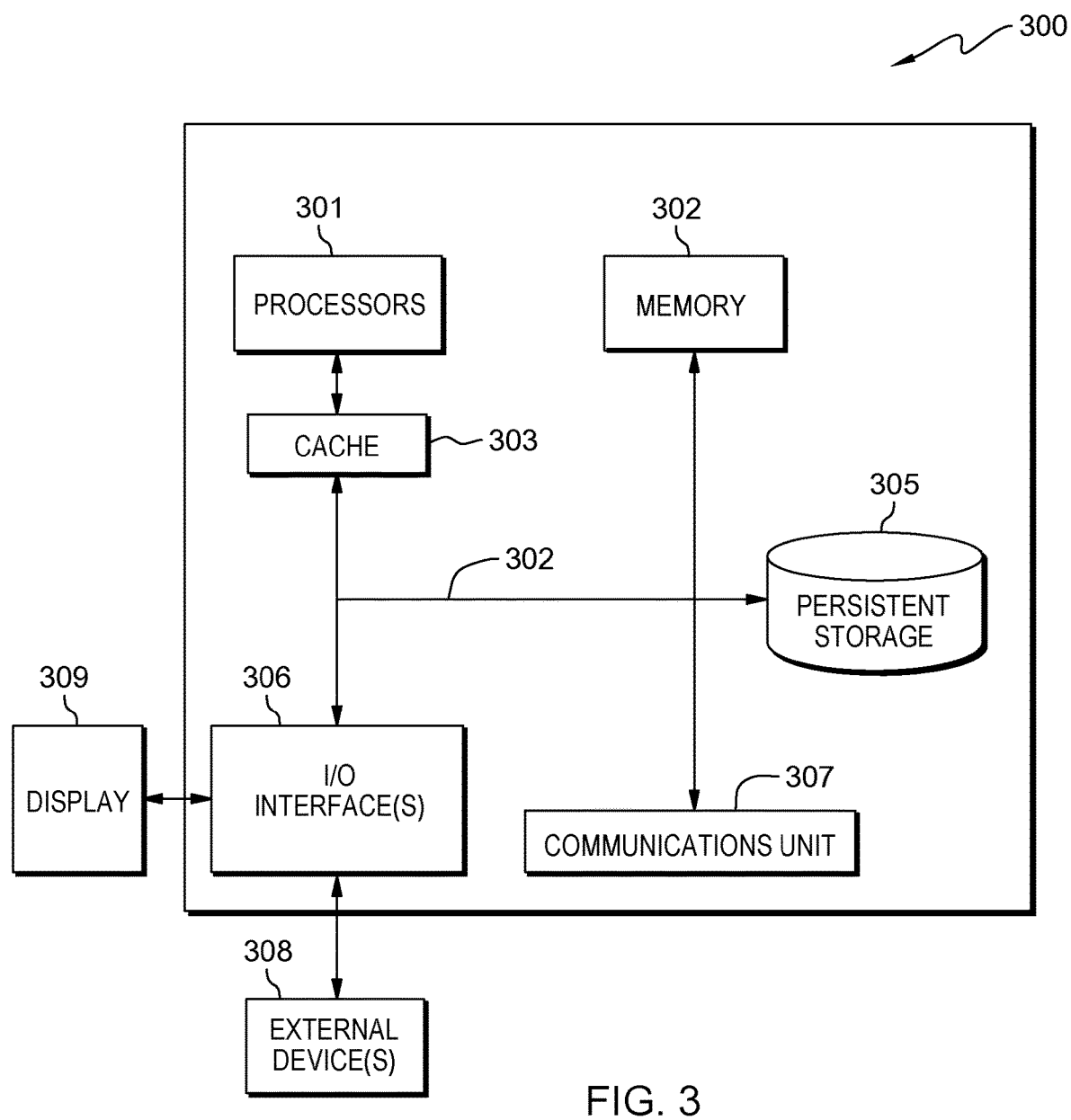
FIG. 3 depicts a block diagram of components of the computing device of FIG. 1, in accordance with an embodiment of the present invention.

FIG. 3 depicts computer system 300, which is an example of a system that includes components of computing device 30. Computer system 300 includes processors 301, cache 303, memory 302, persistent storage 305, communications unit 307, input/output (I/O) interface(s) 306 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307. Dump analysis program 110 and performance knowledge base 120 may be downloaded to persistent storage 305 of computing device 30 through communications unit 307 of computing device 30.

I/O interface(s) 306 allows for input and output of data with other devices that may be connected to each computer system. For example, I/O interface 306 may provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention, e.g., dump analysis program 110 and performance knowledge base 120, can be stored on such portable computer readable storage media and can be loaded onto persistent storage 305 of computing device 30 via I/O interface(s) 306 of computing device 30. I/O interface(s) 306 also connect to display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for providing a self-learning framework for performance analysis using content-oriented analysis, the method comprising:

during a core dump operation, responsive to receiving user input requesting a performance analysis of a thread of the core dump operation, presenting, by one or more processors, time information and an associated location of the time information for the thread, wherein the presented time information includes an initiation time of the thread;

registering, by the one or more processors, the time information into a knowledge base;

generating, by the one or more processors, debugging information for the thread based on the time information and information associated with similar threads in the knowledge base; and displaying, by the one or more processors, the time information and the generated debugging information.

2. The method of claim 1, wherein displaying the analyzed time information comprises:

displaying, by the one or more processors, an overview of running threads and length of time for each thread, a thread start time previously registered, and long run activities.

3. The method of claim 1, wherein displaying the analyzed time information comprises:
   displaying, by the one or more processors, elapsed run times for the thread;
   providing, by the one or more processors, a time breakdown in a call stack; and
   identifying, by the one or more processors, a performance bottleneck in the thread.

4. The method of claim 1, wherein presenting time information and associated location comprises:
   presenting, by the one or more processors, a call stack, a time attribute, and an actual elapsed run time, wherein the time attribute includes location, name, and object type.

5. The method of claim 1, wherein presenting time information and associated location comprises:
   presenting, by the one or more processors, the time information and location of origin of a variable, based on the variable being used in multiple locations of multiple threads, wherein the variable is a representation of a time attribute.

6. The method of claim 1, wherein displaying the analyzed time information comprises:
   displaying, by the one or more processors, the analyzed time information after a predetermined time period following the analysis of the time information.

7. The method of claim 1, wherein the knowledge base is an extensible markup language (XML) library.

8. A computer program product for providing a self-learning framework for performance analysis using content-oriented analysis, the computer program product comprising:
   one or more computer readable storage media and program instructions stored on the one or more computer readable storage media, the program instructions comprising:
   during a core dump operation, responsive to receiving user input requesting a performance analysis of a thread of the core dump operation, program instructions to present time information and an associated location of the time information for the thread, wherein the presented time information includes an initiation time of the thread;
   program instructions to register the time information into a knowledge base;
   program instructions to generate debugging information for the thread based on the time information and information associated with similar threads in the knowledge base; and
   program instructions to display the time information and the generated debugging information.

9. The computer program product of claim 8, wherein program instructions to display the analyzed time information comprise:
   program instructions to display an overview of running threads and length of time for each thread, a thread start time previously registered, and long run activities.

10. The computer program product of claim 8, wherein program instructions to display the analyzed time information comprise:
    program instructions to display elapsed run times for the thread;
    program instructions to provide a time breakdown in a call stack; and
    program instructions to identify a performance bottleneck in the thread.

11. The computer program product of claim 8, wherein program instructions to present time information and associated location comprise:
    program instructions to present a call stack, a time attribute, and an actual elapsed run time, wherein the time attribute includes location, name, and object type.

12. The computer program product of claim 8, wherein program instructions to present time information and associated location comprise:
    program instructions to present the time information and location of origin of a variable, based on the variable being used in multiple locations of multiple threads, wherein the variable is a representation of a time attribute.

13. The computer program product of claim 8, wherein program instructions to display the analyzed time information comprise:
    program instructions to display the analyzed time information after a predetermined time period following the analysis of the time information.

14. A computer system for providing a self-learning framework for performance analysis using content-oriented analysis, the computer system comprising:
    one or more computer processors, one or more computer readable storage media, and program instructions stored on the computer readable storage media for execution by at least one of the one or more processors, the program instructions comprising:
    during a core dump operation, responsive to receiving user input requesting a performance analysis of a thread of the core dump operation, program instructions to present time information and an associated location of the time information for the thread, wherein the presented time information includes an initiation time of the thread;
    program instructions to register the time information into a knowledge base;
    program instructions to generate debugging information for the thread based on the time information and information associated with similar threads in the knowledge base; and
    program instructions to display the time information and the generated debugging information.

15. The computer system of claim 14, wherein program instructions to display the analyzed time information comprise:
    program instructions to display an overview of running threads and length of time for each thread, a thread start time previously registered, and long run activities.

16. The computer system of claim 14, wherein program instructions to display the analyzed time information comprise:
    program instructions to display elapsed run times for the thread;
    program instructions to provide a time breakdown in a call stack; and
    program instructions to identify a performance bottleneck in the thread.

17. The computer system of claim 14, wherein program instructions to present time information and associated location comprise:
    program instructions to present a call stack, a time attribute, and an actual elapsed run time, wherein the time attribute includes location, name, and object type.

18. The computer system of claim 14, wherein program instructions to present time information and associated location comprise:

program instructions to present the time information and location of origin of a variable, based on the variable being used in multiple locations of multiple threads, wherein the variable is a representation of a time attribute.

19. The computer system of claim 14, wherein program instructions to display the analyzed time information comprise:

program instructions to display the analyzed time information after a predetermined time period following the analysis of the time information.

20. The method of claim 1, further comprising:

generating, by the one or more processors, a diagnosis of an error present in the thread based on the generated debugging information, wherein the generated debugging information includes length of running time of the thread and system flags associated with the thread.

* * * * *